United States Patent [19]

Barnett

[11] 4,253,068
[45] Feb. 24, 1981

[54] CYCLOTRON MASER USING A SPATIALLY NONLINEAR ELECTROSTATIC FIELD

[76] Inventor: Larry R. Barnett, 5115 Knickerbocker Dr., Alexandria, Va. 22310

[21] Appl. No.: 40,932

[22] Filed: May 21, 1979

[51] Int. Cl.³ .............................................. H01S 1/00
[52] U.S. Cl. ........................................... 330/4; 315/3
[58] Field of Search ..................... 330/4, 4.6; 332/7; 331/94; 315/3–5

[56] References Cited

U.S. PATENT DOCUMENTS

| | | | |
|---|---|---|---|
| 3,265,978 | 8/1966 | Clavier et al. | 315/3 |
| 3,315,173 | 4/1967 | Adler | 315/3 |
| 3,346,819 | 10/1967 | Birdsall | 315/3 |
| 3,373,309 | 3/1968 | Poschl et al. | 315/3 |
| 3,398,376 | 8/1968 | Hirschfield | 330/4 |
| 3,441,782 | 4/1969 | Arnaud | 315/3.5 |
| 3,487,336 | 12/1969 | Kaufman | 315/3 |
| 3,708,764 | 1/1973 | Guenord et al. | 315/3.5 |

OTHER PUBLICATIONS

Barnett, "Cyclotron Maser . . . Electrostatic Field," 1978, pp. 1-107, Dissertation Abst. Int. B, 39(6), 2912.

*Primary Examiner*—Nelson Moskowitz

[57] ABSTRACT

A cyclotron maser microwave amplifier or oscillator which utilizes non-relativistic electrons (or other charged particles) in cyclotron motion and a spatially nonlinear electrostatic field. The term "spatially nonlinear electrostatic field" encompasses static electric fields whose magnitude can be described mathematically as varying in a nonlinear manner as a function of position in one or more directions. Completely non-relativistic electrons of very low energy may be used in principle for which phase bunching will occur due to the nonlinear motions (induced by the electrostatic field) resulting in stimulated emission of cyclotron radiation for use in the amplifier or oscillator. This is in complete contrast to the relativistic cyclotron maser (Hirschfield, U.S. Pat. No. 3,398,376) which required the electrons to be acting under the relativistic effect of the electron mass (and hence cyclotron frequency) being a function of its energy to produce the necessary phase bunching and resulting stimulated emission. This new means of cyclotron maser action, in principle, is induced by a variety of spatially nonlinear electrostatic fields.

7 Claims, 5 Drawing Figures

CYCLOTRON MASER USING A SPATIALLY NONLINEAR ELECTROSTATIC FIELD

BACKGROUND

This invention relates to the art of microwave generation and more specifically to the art of cyclotron maser amplifiers and oscillators in which stimulated coherent emission of microwave energy occurs by electrons in cyclotron motion in a magnetic field.

Relativistic cyclotron maser amplifiers and oscillators were originally built by Hirshfield and Wachtel as reported in "Physical Review Letters", Vol. 12, pp. 533–536 (1964), and Hirshfield's U.S. Pat. No. 3,398,376 entitled "Relativistic Electron Cyclotron Maser". The principle of operation of the Hirshfield invention is based on the stimulated emission of cyclotron radiation from free electrons in a magnetic field where such stimulated emission is possible for relativistic electrons, but not for low energy ones, wherein an electron is said to relativistic when its kinetic energy is comparable to its rest energy $mc^2$, about 500,000 electron-volts. The device can still operate on the relativistic principle when the electron energy is less than its rest energy if the electron spends sufficient time according to the criteria, $$\frac{N\tau}{mc^2} > 1$$

where N is the number of cycles spent by the electron. The Hirshfield apparatus uses electrons of the order of 5,000 electric-volt energies resulting in a 1% relativistic increase of mass. In the art, electrons with such energies are commonly called mildly relativistic. Advanced models of the relativistic cyclotron maser typically use electrons with energies in the range of 25,000–100,000 electron-volts.

It is well known in the art, that in order for a system of free electrons in cyclotron motion to impart a net energy gain to an oscillating electromagnetic field or a wave, a phase bunching mechanism must exist. In the relativistic cyclotron maser, the phase bunching mechanism is incurred by utilizing relativistic electrons. The relativistic cyclotron frequency is $$\omega_{cr} = \left(1 - \frac{v^2}{c^2}\right)^{\frac{1}{2}} \omega_c$$

where V is the velocity of the electron, c is the speed of light in vacuum, and $\omega_c$ is the non-relativistic cyclotron frequency given by $$\omega_c = \frac{eB}{m}$$

where e is the electron charge, B is the magnetic field strength, and m is the non-relativistic mass. When an oscillating electromagnetic field of frequency $\omega \simeq \omega_{cr}$ is imposed on a system of relativistic electrons, electrons which lose energy will advance in phase since their frequency is increasing. Electrons that are absorbing energy are retarded in phase since their frequency is decreasing. After a number of cycles the particles become bunched, and for $\omega$ slightly greater than $\omega_{cr}$ the bunching is phased such that a net flow of energy into the oscillating electromagnetic field results.

The present invention incorporates a new physical principle of applying a static electric field of special characteristics to the electrons in cyclotron motion to induce phase bunching. The new physical principle results in the stimulated emission of cyclotron radiation by electrons which results in the stimulated emission of cyclotron radiation by electrons which are completely non-relativistic and hence, in principle, can have very low energy. This invention has significant advantages in that high electron accelerating potentials are not required. No slow-wave propagating structures are required thus allowing the use of simple and overmoded waveguides or cavity resonators. A variety of useful devices and variations based on the principles of this invention are possible.

This invention is based on the work of Larry R. Barnett for a thesis presented at the University of Tennesse, June 1978, entitled "Cyclotron Maser Instability in a Nonlinear Electrostatic Field".

SUMMARY OF THE INVENTION

It is the principal object of this invention to provide a means of obtaining cyclotron maser amplification and osicllation by the use of an applied nonlinear electrostatic field to a system of electrons (or other charged particles) in cyclotron motion.

Other objects and many of the attendant advantages of the present invention will be obvious to those skilled in the art from the following detailed description taken in conjunction with the drawings.

DETAILED DESCRIPTION

Figure 3:
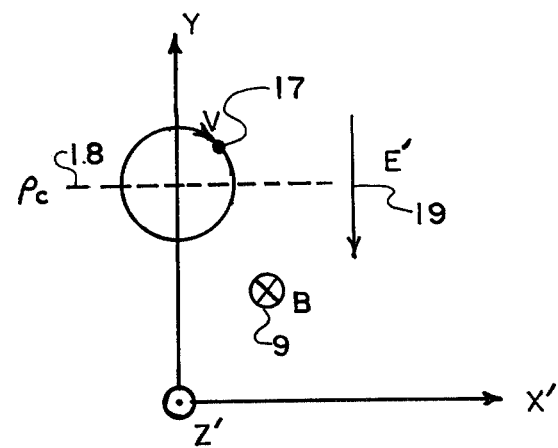
FIG. 3 is a diagram of the electron cyclotron motion in the guiding center frame of motion and the applied nonlinear electrostatic field to illustrate the principles of the mechanism.

Consider the electron of FIG. 3 in the guiding center coordinate frame with initial component of velocity perpendicular and parallel to a uniform magnetic field B in the z' direction with a static electric field E' in the y direction which is a function of y. As the electron moves in its orbit the imposed static electric field applies forces to the electron which varies in magnitude and/or direction depending upon the particular position of the electron. These forces thus modify the normally circularly shaped orbits into non-circular orbits. Should the electron gain or loose energy to an applied microwave field this orbit shape changes as the electron will be moving in different regions of the static field.

Through calculation, I have shown that when a certain shape of static electric field is applied, in particular the nonlinear field already described, the length of time for the electron to complete an orbit cycle is dependent on its energy. Thus the resonance frequency of the electron is energy dependent and a system of these electrons are nonisochronous which can be phase bunched to produce amplification. The following outline of the analytical work of the invention (ref. Barnett PhD thesis) will provide a better understanding for those skilled in the art.

The electric field must always obey Maxwell's equation $$\vec{\nabla} \cdot \vec{E} = -\frac{\sigma}{\epsilon}$$

where $\sigma$ is the charge distribution and $\epsilon$ is the permittivity of the medium. Thus, the electrostatic field can be a function of a spatial coordinate or coordinate due to biased electrodes in a geometrical arrangement, a charge distribution, or a spatial varation in permittivity.

The general non-relativistic equation of an electron for all electric and magnetic fields is $$\frac{d\vec{V}}{dt} = \frac{e}{m}(\vec{E} + \vec{V} \times \vec{B})$$

This equation is not readily solved for solutions of the electron motion when nonuniform electrostatic fields are applied which makes the equation nonlinear.

Since we are primarily concerned with electrons of low energy, let the Larmor radius $r_L$ of the gyro-orbit be much less then any guiding center curvature. Thus the analysis can be presented in a cartesian coordinate system as illustrated in FIG. 3. Let the electric field in the y direction be $$E_y(t) = E_0[f(y)] + E_1 \sin(wt + \psi)$$

where f(y), which describes the electrostatic field, is a general function of y, normalized to unity at the guiding center, $\omega$ is the frequency of the applied alternating electromagnetic field and $\psi$ is the phase. If the electron has a component of velocity in the z direction (parallel to the magnetic field) then the appropriate coordinate system is also moving at the same velocity and direction and the above equation still applies only $\omega$ would correspond to the doppler shifted frequency to the moving coordinate system. The solution of the y component of motion in integral form is $$V_y(t) = V_{y0} \cos \omega_c t + V_{x0} \sin \omega_c t +$$
$$- \frac{e}{m} \int_0^t E_0 f(y) \cos [\omega_c(t - u)] du -$$
$$\frac{e}{m} \int_0^t E_1 \sin(\omega t + \psi) \cos [\omega_c(t - u)] du.$$

Now transform to a moving coordinate system at the guiding center velocity $$\vec{V_{s1}} = \frac{\vec{E} \times \vec{B}}{B^2} = \frac{E_0}{B} \hat{x}.$$

Then, the initial velocity in the moving coordinate x direction is $$V_{x0}^1 = V_{x0} - \frac{E_0}{B_0}$$

where $v_{xo}$ is the initial x direction velocity. Now in the new coordinate system $$V_y(t) = V_{y0} \cos \omega_c t + V_{x0}^1 \sin \omega_c t -$$
$$\frac{e}{m} \int_0^t \{E_0[f(y) - 1] \cdot \cos [\omega_c(t - u)]\} du -$$
$$\frac{e}{m} \int_0^t \{E_1 \sin(\omega t + \psi) \cdot \cos [\omega_c(t - u)]\} du.$$

Now let $$y(t) = y_0(t) + eE_0 Y_1(t) + (eE_0)^2 Y_2(t) + \ldots$$

and $$\omega_c^2 = \omega_0^2 + eE_0 C_1 + (eE_0)^2 C_2 + \ldots$$

where $\omega_0$ is the resonant frequency of the electron and the constant $C_1, C_2, \ldots$ are found in the process of solution. The function $Y_o(t)$ is the first order solution and neglects the nonlinear effects, $y_1(t)$ is the second order component of the solution and contains the corrections to the solution due to nonlinear effects. The functions $Y_2(t)$ and so forth are even higher order corrections. The equation can now be separated into equations of different orders. The first order solution is standard and can be written as $$y_0(t) = \rho_c + \frac{V}{\omega_0} \cos(\omega_0 t - \phi)$$

where the guiding center coordinate, $\rho_c$, is chosen to normalize f(y), $$\rho_c = y(0) + \frac{V_{x0}^1}{\omega_0},$$

and y(o) is the initial y position, and $V = (V_x^2 + V_y^2)^{\frac{1}{2}}$ is the perpendicular velocity in the guiding center coordinate system and is slowly growing or decaying under the influence of the imposed alternating electromagnetic field. The desired result is to obtain an equation relating $\omega_o$ to V.

By using the solution for $Y_o(t)$, $Y_1(t)$ and $C_1$ can be solved in the second order equation. The function $Y_1(t)$ is a long expression containing components of guiding center motion, the magnitude of the fundamental motion, and harmonic motion. It is found that $$C_1 = -\frac{A_1 \omega_0}{mV}$$

where $A_1$ is a Fourier coefficient of the Fourier series $$f[y_0(t)] = \sum_{n=0}^{\infty} A_n \cos n(\omega_0 t - \phi).$$

For the electric field of forms such as $f(y) = y^\gamma$, $e^Y$, $\sin y$, $\cos y$ etc. When $v/\omega < \rho_c$, $f[Y_o(t)]$ are readily expandable in power series and the coefficients $A_n$ for $Y_o(t) = \rho_c + (V/\omega_o) \cos(\omega_o t - \phi)$ will then be a power series of $(V/\omega_o)$:

$$A_n = \sum_{p=0}^{\infty} S_{pn} \left( \frac{V}{\omega_0} \right)^p$$

Then $$A_1 = -\left[ \sum_{p=0}^{\infty} S_{p1} \left( \frac{V}{\omega_o} \right)^p \right] \frac{\omega_o}{mV}.$$

The resonance frequency equation is now $$\omega_o^2 = \omega_c^2 - eE_0 \frac{\omega_o}{mV} \left[ \sum_{p=0}^{\infty} S_{p1} \left( \frac{V}{\omega_o} \right)^p \right].$$

The solution for $y_o(t)$, $Y_1(t)$, and $C_1$ can be used to find the solution to $Y_2(t)$ and $C_2$ etc., but the equations become difficult to handle. For rapid convergence any additional corrections past are negligible.

Functions such as $e^{-y}$, $\sin y$, $\cos y$, etc. can be expressed as combinations or series of the function $y^\gamma$, where $\gamma$ is a constant i.e.

$$e^{-y} = 1 - y - \frac{y^2}{2} - \frac{y^3}{6} - \cdots$$
$$\sin y = y - \frac{y^3}{6} + \frac{y^5}{120} - \cdots$$
etc.

The electric fields of form $y^{-1}$, $y^0$, $y^1$, $y^{-2}$ correspond to the radial field of a cylindrical geometry, a uniform field, a linear field, and a spherical field respectively. Therefore, a complete solution to an electrostatic field of $y^\gamma$ form is useful in that it corresponds to easily obtainable fields and allows insight into how other field shapes will perform. It should be pointed out that any specific field can be carried through this or a similar analysis. Let the electric field function $$f(y) = (\rho_c)^{-\gamma}(y)^\gamma$$

where $(\rho_c)^{-\gamma}$ normalizes $f(y)$ to unity at $y = \rho_c$. Then $$f[y_o(t)] = \rho_c^{-\gamma} \left[ \rho_c + \frac{V}{\omega_o} \cos(\omega_o t - \phi) \right]^\gamma$$

The expanding into a power series and collecting all terms together of like frequency generates the Fourier series as described where now the coefficient $$A_1 = \rho_c^{-\gamma} \left[ \gamma \rho_c^{\gamma-1} \frac{V}{\omega_o} + \frac{\gamma(\gamma-1)(\gamma-2)}{8} \rho_c^{\gamma-3} \frac{V^3}{\omega_o^3} + \cdots \right]$$

keeping only the first two terms. Note that the terms $$S_{01} = 0, S_{11} = \gamma \rho_c^{-1}, S_{21} = 0,$$
$$S_{31} = \frac{\gamma(\gamma-1)(\gamma-2)}{8} \rho_c^{-3}, S_{41} = 0$$

etc. Now the frequency shift equation becomes $$\omega_o^2 = \omega_c^2 + \frac{eE_0\gamma}{m\rho_c} + \frac{eE_0}{m\rho_c^3} \frac{V^2}{\omega_o^2} \left[ \frac{\gamma(\gamma-1)(\gamma-2)}{8} \right]$$

for: $f[y_o(t)] = \rho_c^{-\gamma}[y_o(t)]^\gamma$, $y_o(t) = \rho_c + \frac{V}{\omega_o}[\cos(\omega_o t) - \phi]$, for $\frac{V}{\omega_o} < \rho_c$.

Figure 5:
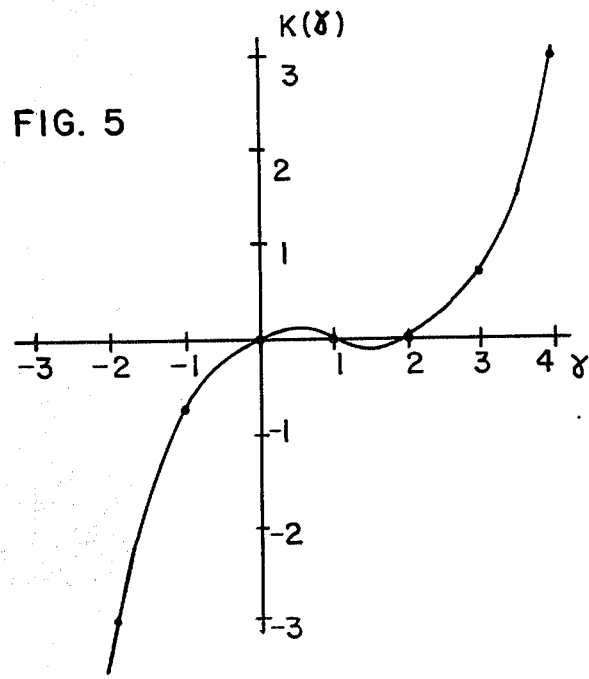
FIG. 5 is a plot of the function K($\partial$) which predicts the frequency shift to be expected for electrostatic fields of the form $y_\partial$.

The second term on the right is a constant shift term and an energy dependent shift term. Since the maser instability is brought about because of bunching by nonisochronous electrons, the degree of this instability will be dependent on the magnitude of the energy shift term. Plotting the function $$K(\gamma) = \frac{\gamma(\gamma-1)(\gamma-2)}{8}$$

will give the values of $\gamma$ that provide the largest frequency shifting with electron energy and will give insight into which electric field will give a relatively large frequency shifting as a function of electron energy. The function $K(\gamma)$ is plotted in FIG. 5. Note that the direction of frequency shift can be in either direction, and is zero at $\gamma = 0, 1, 2$ which corresponds to $y^0$, $y^1$, and $y^2$. The function $y^0$ corresponds to a linear field. For the linear field, a constant shift would exist, but no energy dependent shift. The function $y^{-1}$ would correspond to a radial field in a coaxial geometry and $y^{-2}$ to a spherical field. The only nonlinear field that does not have the energy shift is the $y^2$ field. As can be seen from FIG. 5, to have a reasonably large energy dependent frequency shift and hence a phase bunching and amplifying capability, a field should be utilized that has $k(\gamma)$ large in magnitude.

Figure 2:
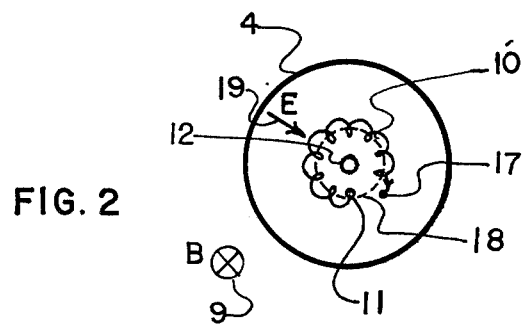
FIG. 2 is an end view of the electron motion in the coaxial geometry of FIG. 1.

FIG. 2 shows the radial electrostatic field easily established in a coaxial geometry and the resulting electron motion when a magnetic field is applied axially. The electron will then move approximately in a trochoidal path with guiding center at constant radius, $\rho_c$. The Electrostatic field is then $$\vec{E}(r) = E_o(\rho_c)^1(r)^{-1}\hat{r}.$$

Then for this radial field case $$\omega_o^2 = \omega_c^2 - \frac{eE_o}{\rho_c m} - \frac{3eE_oV^2}{4m\rho_c^3\omega_c^2}$$

which can be put in the form $$\omega_o = \omega_c^1 \left[ 1 + \frac{V^2}{\eta} \right]^{\frac{1}{2}}$$

where $$\omega_c^{1^2} = \omega_c^2 + \frac{eE_o\gamma}{m\rho_c}$$

and $$\eta = \frac{m\rho_c^3 \omega_c^4}{eE_o K(\gamma)}$$

The nonlinear electrostatic field creates a nonisochronous system of electrons in cyclotron motion, as described by the energy dependent resonance frequency equation and phase bunching is expected. Techniques to obtain the growth rate of the electromagnetic wave, conditions for amplification, etc., are well known in the art. One such technique is following individual electron motion for a number of electrons (either mathematically or by computer) and keeping track of the energy balance between the electrons and the electromagnetic wave. The results of such a mathematical analysis (ref. Barnett PhD. thesis) gives the criteria for amplification to be $$\frac{V^2}{|\eta|} > \frac{1}{\omega_c \tau}$$

where $\tau$ is the length of time the electrons interact with the electromagnetic wave and $V$ is the perpendicular (to the magnetic field) velocity in the guiding center coordinate system. The number of cycles the electron interacts is then $$N = \frac{\omega_c \tau}{2\pi}$$

and so $$\frac{2\pi N V^2 |eE_o K(\gamma)|}{m\rho_c^3 \omega_c^4} > 1$$

is the criteria for amplification to occur. The growth rate of the electromagnetic wave is $$\left.\frac{dE_1}{dt}\right|_{at\ \Delta\omega\tau\ <<\ 1} \cong \frac{n_e e^2 E_1}{8\epsilon_o m} \tau \left(\frac{\Delta\omega\tau^2 V^2 \omega_c}{6\eta} - 1\right)$$

where $$\Delta\omega = \omega - \omega_c^1 \left(1 + \frac{V^2}{\eta}\right)^{\frac{1}{2}}$$

is the frequency difference, or slip, between the applied wave and exact resonance of the electrons.

The radial electrostatic field of a coaxial geometry has been used in the first embodiment of the invention. In this case the electrostatic field is of the form $E(r) = E_o \rho_c^{-\gamma} r^\gamma$, where r is the radial dimension, and $$\eta = \frac{-4\rho_c^3 \omega_c^4}{3\ e\ E_o}$$

Therefore the criteria for amplification to occur is $$\frac{3\ \tau V^2 |eE_o|}{4\ m\rho_c^3 \omega_c^3} > 1$$

At a frequency of 10 Ghz and an electrostatic field of $10^6$ volts/meter at a radius $\rho_c$ of $\frac{1}{2}$ millimeter, approximately: $V^2 \tau > 10^5$ is required. Then for a $\tau$ of only $10^{-7}$ second implies that the transverse velocity $V$ in the guiding center frame only needs to be $10^6$ meters/sec or an energy of only 3 electron-volts. As a matter of comparison the relativistic cyclotron maser criteria at this frequency and interaction time requires an electron energy of the order of 10,000 electron-volts.

Figure 1:
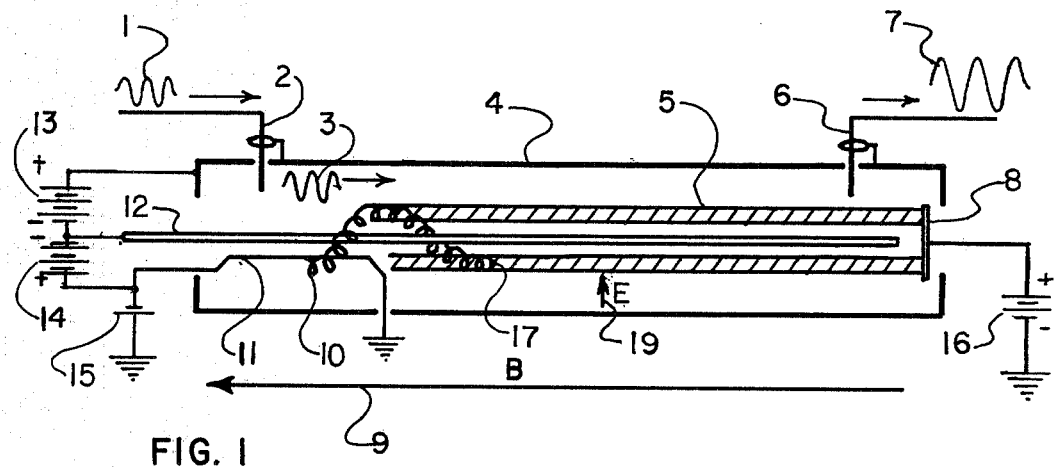
FIG. 1 is the diagram of an embodiment of the invention as an amplifier using the radial electrostatic field of a coaxial geometry.

The amplifier employing the coaxial arrangement is shown in FIG. 1. The input microwave signal 1 at a frequency of 10.0 Ghz is injected into the waveguide 4 by a coupler 2 and propagates down the waveguide in a normal coaxial waveguide mode as depicted by the wave symbol 3. An output coupler 6 extracts the amplifier signal. The amplifier is thus a traveling-wave amplifier. The center conductor 12 is biased at a negative potential with respect to the outer conductor 4 by by voltage source 13 establishing the radial electrostatic field 19. Magnetic field 9, as established by a solenoid; is uniform throughout and parallel to the coaxial waveguide. Since such low energy is required of the electrons, they can be launched by an emitting filament 11 located in the waveguide and accelerated by the electrostatic field 19. In this case i.e., with no additional initial perpendicular energy, the guiding center velocity in the laboratory frame will equal to transverse velocity in the guiding center frame. Should higher energy electrons be desired, they can be produced in a lower magnetic field and injected into the interaction region as well known in the art. The electrons emitted by the filament 11 travel in a trochiodal trajectory in the electrostatic and magnetic field as depicted by the electron 17 and the trajectory 10 in FIG. 2. The guiding center 18 is at radius $\rho_c$ from center. The voltage source 14 biases the filament positive with respect to the center conductor at a potential valve as to not disturb the radial field established by voltage source 13. The collector electrode 8 is biased positive with respect to the filament such as to cause the electrons to drift to the collector as depicted by the path 10 in FIG. 1. The many electrons emitted form a rotating annular electron beam 5.

Figure 4:
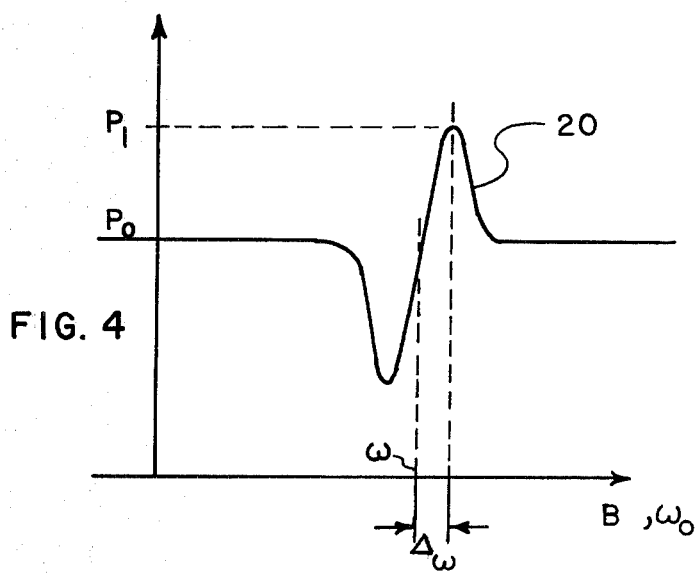
FIG. 4 is the amplification of microwaves as the magnetic field is swept to cause the cyclotron frequency to pass through resonance with the applied microwave signal input at 10 Ghz.

When the magnetic field is swept such as to sweep the electron resonance frequency $\omega_o$ through resonance with the microwave signal frequency $\omega$, the output power 20 as received at coupler 6 and a crystal is shown in FIG. 4. The peak at $\rho_1$ is the amplified signal above the baseline strength $\rho_o$ when the electron resonance frequency is at the proper point i.e., at $\omega_o$ approximately equal, but slightly larger by $\Delta_\omega$, to $\omega$. Continuous amplification occurs when the magnetic field is held at that value. Similar, though weaker, amplification patterns occure when the device is operated at harmonics of the cyclotron frequency i.e., $\omega$ approximately equal $2\omega_c$, $3\omega_c$, etc. The pattern 20 is of opposite shape as would be obtained with the relativistic cyclotron maser lending proof that this is a different amplifying mechanism.

Figure 6:
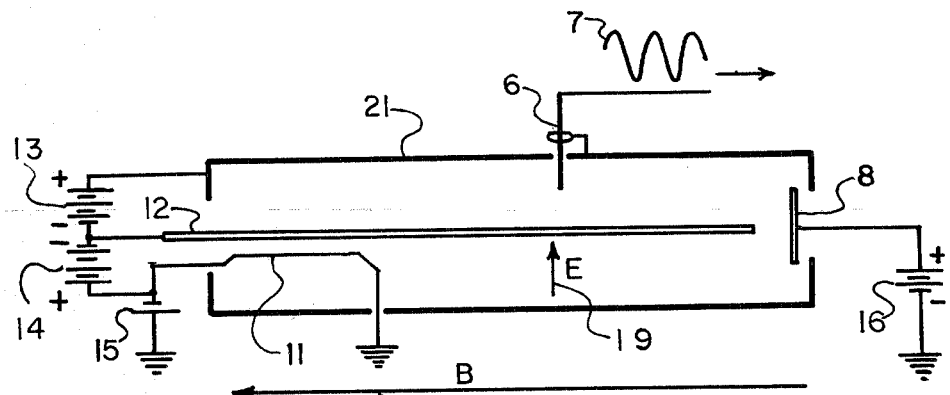
FIG. 6 is the diagram of an embodiment of the invention as an oscillator.

By removing the microwave input coupler 2 and reducing the coupling factor of the output coupler a high Q cavity 21 is made. With a sufficiently high Q the device will self-oscillate. The osicllator diagram is shown in FIG. 6 and its operation is similar to the previous discussion for the amplifier. The electrons are not depicted in FIG. 6 as were in FIG. 1. Such an oscillator, like the amplifier, will also function at cyclotron harmonics.

It should again be stressed that other embodiments and variations are possible based on the principles described, in particular, the implimentation of suitable nonlinear electrostatic fields, waveguides, cavities, and electron beams may take many forms.

I claim:

1. An amplifying maser device utilizing a spatially nonlinear electrostatic field to induce stimulated cyclotron emission of radiation by electrons which comprises; a fast-wave propagating electromagnetic waveguide to support the wave, and an input and output coupling means, a means of producing a magnetic field in the said waveguide, a means of producing a spatially nonlinear electrostatic field wherein the said spatially nonlinear electrostatic field is defined to be a static electric field which is described as: The magnitude of said static electric field having a nonlinear variation as a function of position in one or more directions and serves to cause an electron moving in cyclotron orbits in said magnetic field to have it's cyclotron orbit to be modified and the cyclotron resonance frequency to be modified where the said resonance frequency is a function of the magnitude of the said orbit, a means of injecting electrons with components of velocity parallel and transverse to the said magnetic field.

2. The device of claim 1 where an oscillator device is made by utilizing a cavity resonator.

3. The device of claim 1 where multiple cavities and waveguides are utilized in amplifying or oscillating configurations.

4. The device of claim 1 wherein the said nonlinear electrostatic field is produced by: (a) electrodes (b) charge collected (c) changes in the permittivity as a function of position.

5. The device of claim 1, where charge carriers in a solid state material, holes or electrons, are utilized.

6. The device of claim 1 wherein the operation is at a harmonic of the cyclotron frequency.

7. The device of claim 1 in which the injected electrons have sufficient energy to be relativistic such that: The cyclotron resonance frequency is a function of the magnitude of the cyclotron orbit due to combined action of the said nonlinear electrostatic field and the relativistic mass dependence of the said injected electrons.

* * * * *